United States Patent
Long et al.

(10) Patent No.: US 9,874,687 B2
(45) Date of Patent: Jan. 23, 2018

(54) SINGLE-MODE FIBER WITH ULTRALOW ATTENUATION AND LARGE EFFECTIVE AREA

(71) Applicant: YANGTZE OPTICAL FIBRE AND CABLE JOINT STOCK LIMITED COMPANY, Wuhan, Hubei (CN)

(72) Inventors: Shengya Long, Hubei (CN); Lei Zhang, Hubei (CN); Jihong Zhu, Hubei (CN); Jun Wu, Hubei (CN); Ruichun Wang, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 11 days.

(21) Appl. No.: 15/448,292

(22) Filed: Mar. 2, 2017

(65) Prior Publication Data

US 2017/0176674 A1 Jun. 22, 2017

Related U.S. Application Data

(63) Continuation of application No. PCT/CN2015/094159, filed on Nov. 10, 2015.

(30) Foreign Application Priority Data

Nov. 12, 2014 (CN) .......................... 2014 1 0633787

(51) Int. Cl.
*G02B 6/036* (2006.01)
*G02B 6/02* (2006.01)

(52) U.S. Cl.
CPC ..... *G02B 6/03683* (2013.01); *G02B 6/02014* (2013.01); *G02B 6/02019* (2013.01); *G02B 6/02266* (2013.01)

(58) Field of Classification Search
CPC ............ G02B 6/03683; G02B 6/02014; G02B 6/02019
See application file for complete search history.

(56) References Cited

U.S. PATENT DOCUMENTS 6,483,975 B1 * 11/2002 Hsu .................... G02B 6/02019
                                                              385/123
6,711,330 B1 * 3/2004 Donlagic ............. G02B 6/0288
                                                              385/123
(Continued)

FOREIGN PATENT DOCUMENTS

CN         1550802 A      12/2004
CN       102043196 A       5/2011
(Continued)

OTHER PUBLICATIONS

Carratt et al., MCVD Plasma Process for Manufacturing Single-Mode Optical Fibers for Terrestrial Applications;!.; 1225 Electrical Communication (1994) 1st Quarter, Paris, France.*

(Continued)

*Primary Examiner* — Peter Radkowski
(74) *Attorney, Agent, or Firm* — Tim Tingkang Xia, Esq.; Locke Lord LLP

(57) ABSTRACT

A single-mode fiber with an ultra-low attenuation and a large effective area includes a core layer having a radius of 4.8 to 6.5 and a relative refractive index difference $\Delta n_1$ of –0.06% to 0.10%, and cladding layers. The cladding layers includes an inner cladding layer surrounding the core layer, a trench cladding layer surrounding the inner cladding layer, an auxiliary outer cladding layer surrounding the trench cladding layer, and an outer cladding layer surrounding the auxiliary cladding layer. The inner cladding layer has a radius of 9 to 15 μm and a relative refractive index difference of –0.40% to –0.15%. The trench cladding layer has a radius of 12 to 17 μm and a relative refractive index difference of (Continued)

−0.8% to −0.3%. The auxiliary outer cladding layer has a radius of 37 to 50 μm and a relative refractive index difference of −0.6% to −0.25%. The outer cladding layer is a pure-silicon-dioxide glass layer.

12 Claims, 1 Drawing Sheet

(56) References Cited

U.S. PATENT DOCUMENTS

| | | | | |
|---|---|---|---|---|
| 6,904,218 B2* | 6/2005 | Sun | G02B 6/02014 | 385/123 |
| 6,925,239 B2* | 8/2005 | Wang | G02B 6/02261 | 385/123 |
| 7,450,807 B2* | 11/2008 | Bickham | G02B 6/0365 | 385/123 |
| 7,526,169 B2* | 4/2009 | Bickham | G02B 6/3887 | 385/125 |
| 7,620,282 B2* | 11/2009 | Bickham | G02B 6/0365 | 385/124 |
| 7,903,917 B2* | 3/2011 | Bickham | G02B 6/0365 | 385/124 |
| 8,200,057 B2* | 6/2012 | Han | C03B 37/018 | 385/124 |
| 8,322,166 B2* | 12/2012 | Bookbinder | C03B 37/0253 | 65/378 |
| 8,385,701 B2* | 2/2013 | Bookbinder | G02B 6/03683 | 385/123 |
| 8,488,931 B2* | 7/2013 | Bigot-Astruc | G02B 6/0365 | 385/127 |
| 8,538,219 B2* | 9/2013 | Bickham | G02B 6/02019 | 385/126 |
| 8,588,569 B2* | 11/2013 | Bookbinder | G02B 6/028 | 385/124 |
| 8,666,214 B2* | 3/2014 | Bookbinder | G02B 6/028 | 385/124 |
| 8,676,015 B2* | 3/2014 | Sillard | G02B 6/02009 | 264/1.24 |
| 8,798,423 B2* | 8/2014 | Sillard | G02B 6/03666 | 385/127 |
| 8,798,424 B2* | 8/2014 | Bigot-Astruc | G02B 6/03666 | 385/123 |
| 8,849,082 B2* | 9/2014 | Bookbinder | G02B 6/028 | 385/123 |
| 8,891,925 B2* | 11/2014 | Bickham | G02B 6/02395 | 385/127 |
| 8,953,917 B2* | 2/2015 | Berkey | G02B 6/028 | 385/127 |
| 8,983,260 B2* | 3/2015 | Sillard | G02B 6/02019 | 264/1.24 |
| 9,207,396 B2* | 12/2015 | Wang | G02B 6/02019 | |
| 9,279,935 B2* | 3/2016 | Frigerio | C03B 37/01211 | |
| 2003/0026566 A1* | 2/2003 | Diep | G02B 6/02014 | 385/123 |
| 2004/0228593 A1* | 11/2004 | Sun | G02B 6/02014 | 385/127 |
| 2005/0100295 A1* | 5/2005 | Wang | G02B 6/02261 | 385/127 |
| 2005/0262876 A1* | 12/2005 | Jourdier | C03B 37/01291 | 65/391 |
| 2007/0077016 A1* | 4/2007 | Bickham | G02B 6/02242 | 385/128 |
| 2008/0056654 A1* | 3/2008 | Bickham | G02B 6/0365 | 385/124 |
| 2008/0056658 A1* | 3/2008 | Bickham | G02B 6/0365 | 385/127 |
| 2008/0124028 A1* | 5/2008 | Bickham | G02B 6/3887 | 385/55 |
| 2010/0046899 A1* | 2/2010 | Bickham | G02B 6/0365 | 385/124 |
| 2011/0058780 A1* | 3/2011 | Han | C03B 37/018 | 385/124 |
| 2011/0064368 A1* | 3/2011 | Bookbinder | G02B 6/03683 | 385/123 |
| 2011/0085770 A1* | 4/2011 | Bigot-Astruc | G02B 6/0365 | 385/123 |
| 2011/0188823 A1* | 8/2011 | Sillard | G02B 6/02009 | 385/123 |
| 2011/0188826 A1* | 8/2011 | Sillard | G02B 6/02019 | 385/127 |
| 2011/0211796 A1* | 9/2011 | Bookbinder | G02B 6/03627 | 385/126 |
| 2012/0033923 A1* | 2/2012 | Takenaga | G02B 6/02333 | 385/125 |
| 2012/0106909 A1* | 5/2012 | Bickham | G02B 6/03683 | 385/124 |
| 2012/0125053 A1* | 5/2012 | Bookbinder | C03B 37/0253 | 65/378 |
| 2012/0301093 A1* | 11/2012 | Sillard | G02B 6/03666 | 385/126 |
| 2012/0315006 A1* | 12/2012 | Bigot-Astruc | G02B 6/03666 | 385/126 |
| 2013/0044987 A1* | 2/2013 | Bickham | G02B 6/02395 | 385/123 |
| 2013/0136405 A1* | 5/2013 | Bookbinder | G02B 6/028 | 385/124 |
| 2013/0136406 A1* | 5/2013 | Bookbinder | G02B 6/028 | 385/124 |
| 2013/0136407 A1* | 5/2013 | Berkey | G02B 6/028 | 385/124 |
| 2013/0136408 A1* | 5/2013 | Bookbinder | G02B 6/028 | 385/124 |
| 2013/0272670 A1* | 10/2013 | Frigerio | C03B 37/01211 | 385/126 |
| 2015/0301276 A1* | 10/2015 | Wang | G02B 6/02019 | 385/127 |
| 2017/0075061 A1* | 3/2017 | Bookbinder | G02B 6/03627 | |

FOREIGN PATENT DOCUMENTS

| | | | |
|---|---|---|---|
| CN | 102933996 A | | 2/2013 |
| CN | 103380389 A | | 10/2013 |
| CN | 104360434 A | | 2/2015 |
| JP | 2004361200 A | * | 12/2004 |
| JP | 2005140609 A | * | 6/2005 |
| JP | 2005195921 A | * | 7/2005 |
| JP | 2006038898 A | * | 2/2006 |
| JP | 2010102138 A | * | 5/2010 |
| JP | 2011027945 A | * | 2/2011 |
| JP | 2011203552 A | * | 10/2011 |
| JP | 2013088457 A | * | 5/2013 |
| JP | 2013088458 A | * | 5/2013 |
| JP | 2013088607 A | * | 5/2013 |

OTHER PUBLICATIONS

International Search Report (ISR) issued by the State Intellectual Property Office of the Peoples Republic of China dated Feb. 15, 2016 for PCT/CN2015/094159, China.

* cited by examiner

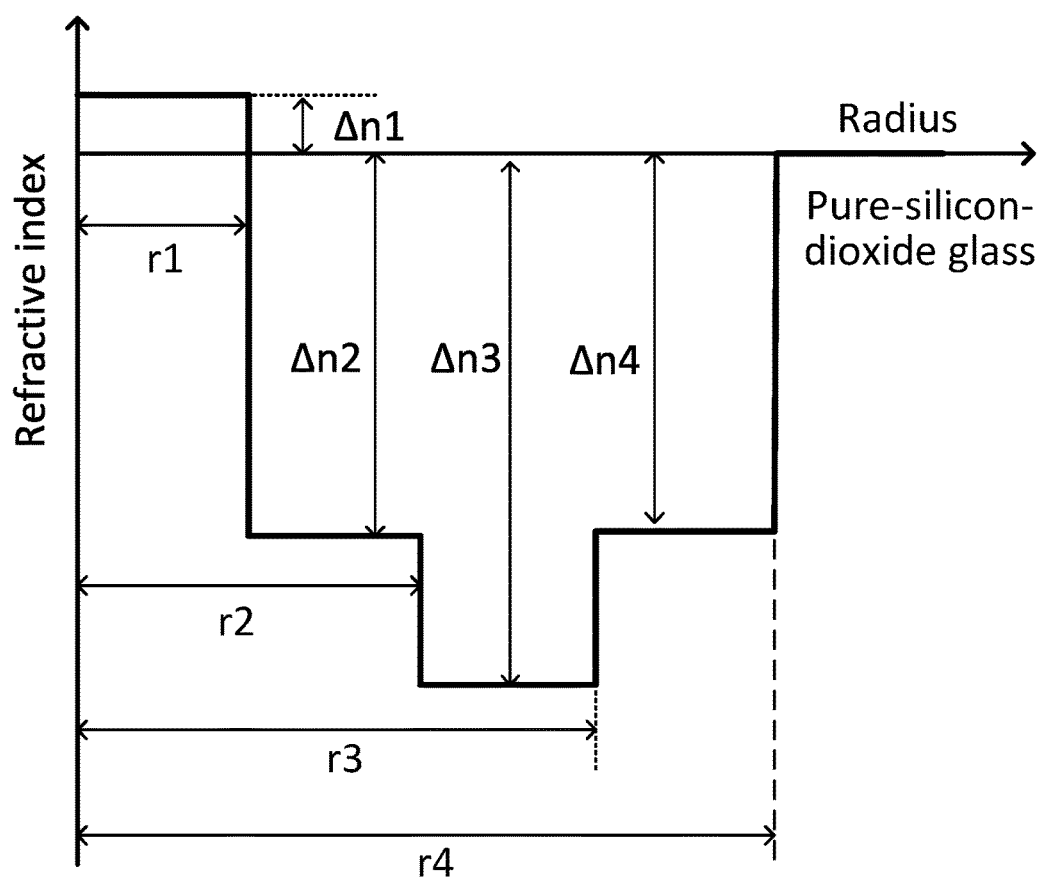

SINGLE-MODE FIBER WITH ULTRALOW ATTENUATION AND LARGE EFFECTIVE AREA

CROSS-REFERENCE TO RELATED APPLICATIONS

This application is a continuation application of International Patent Application No. PCT/CN2015/094159, filed Nov. 10, 2015, which itself claims priority to Chinese Patent Application No. 201410633787.5, filed Nov. 12, 2014 in the State Intellectual Property Office of P.R. China, which are hereby incorporated herein in their entireties by reference.

FIELD OF THE INVENTION

The present invention relates generally to an optical fiber, and more particularly, to a single-mode optical fiber with an ultralow attenuation and a large effective area.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

With the rapid increasing of IP network data services, operators have an increasing demand for transmission capacity, and the capacity of a single fiber in an existing network is gradually approximating the limit of 100 Tbps. Commercial 100G transmission systems has already begun in the year of 2013. How to further increase the transmission capacity on the basis of 100G transmission signals has drawn the attention of equipment manufactures and operators.

In 100G and 100G beyond systems, coherent receiving and digital signal processing (DSP) technologies are adapted at a receive end, and dispersion and polarization mode dispersion accumulated in an entire transmission process can be compensated in the electronic domain. Polarization mode multiplexing and various high order modulation manners, for example, PM-QPSK, PDM-16QAM, and PDM-32QAM, even PDM-64QAM and CO-OFDM, are adapted to reduce a baud rate of a signal. However, high order modulation manners are quite sensitive to the nonlinear effect, and therefore raise a higher requirement for an optical signal-to-noise ratio (OSNR). The introduction of a fiber with a low loss and a large effective area can bring increase in OSNR and decrease in nonlinear effect for a system. When a system with a high power density is used, the nonlinear coefficient, which is defined as $n2/A_{\textit{eff}}$, is a parameter for evaluating system performance due to the nonlinear effect, where n2 is a nonlinear refractive index of a transmission fiber, and $A_{\textit{eff}}$ is an effective area of the transmission fiber. The increasing of an effective area of a transmission fiber can reduce the nonlinear effect in the fiber.

Currently, a conventional single-mode fiber for terrestrial transmission system lines has an effective area of only approximately 80 $\mu m^2$ at the wavelength of 1550 nm. A terrestrial long-distance transmission system has a higher requirement for an effective area of a fiber, where the effective area should be generally larger than 100 $\mu m^2$. To reduce laying costs, every effort should be made to reduce use of repeaters. In a repeater-free transmission system, for example, a submarine transmission system, an effective area of a transmission fiber is preferably larger than 130 $\mu m^2$. However, in current designing of a refractivity profile of a fiber with a large effective area, a large effective area is often obtained by increasing a diameter of an optical core layer for transmitting optical signals. Such schemes have some design difficulties. On one hand, a core layer of a fiber and a cladding layer close thereto mainly determine basic performance of the fiber, and occupy a large proportion in manufacture costs of the fiber. If the radial size is designed to be excessively large, the manufacture costs of the fiber is bound to increase, pushing up the price of the fiber, which forms a barrier for wide application of such fibers. On the other hand, compared with a conventional single-mode fiber, an increase in the effective area of the fiber causes deterioration in some other parameters of the fiber: for example, a cutoff wavelength of the fiber increases, and a single-mode state of an optical signal in a transmission waveband in the fiber is difficult to be ensured if the cutoff wavelength is excessively large. In addition, if a refractivity profile of the fiber is not designed appropriately, deterioration in parameters such as a bending performance and a dispersion may also be caused.

Another characteristic of a fiber restricting long-distance large-capacity transmission is attenuation. Currently, an attenuation of conventional G.652.D fiber is generally 0.20 dB/km at 1550 nm wavelength. Laser energy gradually decreases after a long-distance transmission; therefore, a signal needs to be re-amplified by using a repeater. Compared with costs of fibers and cables, costs of repeater related equipment and maintenance occupy more than 70% of those of an entire link system. Therefore, if a low-attenuation or ultralow-attenuation fiber is designed, a transmission distance may be effectively extended, and construction and maintenance costs may be reduced. According to related calculations, if an attenuation of a fiber decreases from 0.20 dB/km to 0.16 dB/km, construction costs of an entire link decreases approximately 30%.

Therefore, it becomes an important subject in the fiber manufacture field to design a fiber with an ultra-low attenuation and a large effective area. U.S. Publication No. US2010/022533 discloses a design of a fiber with a large effective area. To obtain a lower Rayleigh coefficient, a pure-silicon core design is adapted, and there is no germanium and fluorine co-doped in the core layer, and silicon dioxide doped with fluorine is used as a cladding layer in the design. For such a pure-silicon core design, it requires complex viscosity matching inside the fiber, and it is required that extremely low speed is used in a wiredrawing process to avoid an attenuation increase caused by internal defects of the fiber due to high-speed wiredrawing, leading to an extremely complex manufacture process.

EP Patent No. EP2312350 proposes designs of a fiber with a large effective area that does not use a pure-silicon core design. A design of a stepped subsided cladding structure is adapted, and a pure-silicon-dioxide cladding layer structure is used in a design, and related performance can meet requirements of large-effective-area fibers G.654.B and G.654.D. However, in these designs, a maximum radius of a fluorine-doped cladding part is 36 $\mu m$. Although it can be ensured that a cable cutoff wavelength of the fiber is less than or equal to 1530 nm, affected by the small fluorine-doped radius, microscopic and macroscopic bending performance of the fiber become worse, and therefore an attenuation increases in a fiber cable process. Related bending performance is also not mentioned in the document.

Chinese Patent No. CN10232392A describes a fiber with a larger effective area. Although an effective area of the fiber in this invention reaches more than 150 µm², which is realized by adapting a conventional design of a germanium and fluorine co-doped core layer, and by sacrificing the performance index of cutoff wavelength. It allows a cable cutoff wavelength larger than 1450 nm, and in the described embodiments, a cable cutoff wavelength even reaches more than 1800 nm. In an actual application, cutoff in an communication applied waveband in a fiber is difficult to be ensured for an excessively large cutoff wavelength, and therefore a single-mode state in transmission of an optical signal cannot be ensured. Therefore, such a fiber may face a series of practical problems in an application. In addition, in the embodiments listed in this invention, a subsided cladding layer outer-radius $r_3$ is at least 16.3 which is also slightly excessively large. In the disclosure, fiber parameters (such as an effective area and a cutoff wavelength) and fiber manufacture costs are not optimally combined.

Therefore, a heretofore unaddressed need exists in the art to address the aforementioned deficiencies and inadequacies.

SUMMARY OF THE INVENTION

One of the objectives of the present invention is to design an optical fiber with an ultra-low attenuation and a large effective area that has low fiber manufacture costs. The fiber has a cable cutoff wavelength less than 1530 nm, and better bending loss and dispersion performance.

In one aspect of the invention, a single-mode fiber with an ultra-low attenuation and a large effective area includes a core layer and cladding layers surrounding the core layer.

In certain embodiments, the core layer has a radius $r_1$ in a range of about 4.8 µm to 6.5 µm, and a relative refractive index difference $\Delta n_1$ in a range of about −0.06% to 0.10%.

In certain embodiments, the cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary cladding layer. The inner cladding layer has a radius $r_2$ in a range of about 9 µm to 15 µm and a relative refractive index difference $\Delta n_2$ in a range of about −0.40% to −0.15%. The trench cladding layer has a radius $r_3$ in a range of about 12 µm to 17 µm and a relative refractive index difference $\Delta n_a$ in a range of about −0.8% to −0.3%. The auxiliary outer cladding layer has a radius $r_4$ in a range of about 37 µm to 50 µm and a relative refractive index difference $\Delta n_3$ in a range of about −0.6% to −0.25%. The outer cladding layer is a pure-silicon-dioxide glass layer.

In certain embodiments, the core layer is a germanium and fluorine co-doped silicon-dioxide glass layer, or a germanium-doped silicon-dioxide glass layer, wherein a doping contribution of germanium is in a range of about 0.02% to 0.10%.

In certain embodiments, the relative refractive index difference $\Delta n_2$ of the inner cladding layer is in a range of about −0.32% to −0.21%.

In certain embodiments, an effective area of the fiber at a wavelength of about 1550 nm is in a range of about 100 µm² to 140 µm², preferably in a range of about 119 µm² to 140 µm².

In certain embodiments, a cable cutoff wavelength of the fiber is equal to or less than about 1530 nm.

In certain embodiments, a dispersion of the fiber at a wavelength of about 1550 nm is equal to or less than about 23 ps/nm*km, and a dispersion of the fiber at a wavelength of about 1625 nm is equal to or less than about 27 ps/nm*km.

In certain embodiments, an attenuation of the fiber at a wavelength of about 1550 nm is equal to or less than about 0.185 dB/km, and equal to or less than about 0.175 dB/km in preferred conditions.

In certain embodiments, a microbending loss of the fiber at a wavelength of about 1700 nm is equal to or less than about 5 dB/km.

In certain embodiments, a macrobending loss of the fiber at a wavelength of about 1550 nm when bended 10 turns with a bending radius R of 15 mm is equal to or less than about 0.25 dB, and a macrobending loss of the fiber at a wavelength of about 1550 nm when bended 1 turn with a bending radius R of 10 mm is equal to or less than about 0.75 dB.

Among other things, beneficial effects of the present invention lie in that:

1. A germanium-doped core layer design is adapted, internal viscosity matching of the fiber is designed appropriately, defects in a fiber preparation process are reduced, and an attenuation parameter of the fiber is decreased.

2. A proper fluorine-doped subsided structure of the fiber is designed, and core layer profiles of the fiber are designed appropriately, so that the fiber has an effective area equal to or greater than about 100 µm², and the effective area may be equal to or greater than about 130 µm², or even greater than about 140 µm² in a preferred parameter range.

3. Comprehensive performance parameters such as a cutoff wavelength, a bending loss, and a dispersion of the fiber in the present invention are good in an application waveband. A sufficiently small cable cutoff wavelength ensures a single-mode state of an optical signal in a C-waveband transmission application in the fiber. A fiber profile uses a multi-layer stepped subsided cladding layer structure, where fundamental mode leakage is limited by virtue of the wide subsided cladding layer structure, improving a bending loss of the fiber.

4. The outmost cladding layer structure uses a pure-silicon-dioxide design, which reduces a proportion of fluorine-doped glass in the fiber, and thereby reduces manufacture costs of the fiber.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

FIG. 1 is a diagram of refractive-index profile structure distribution according to an embodiment of the present invention.

DETAILED DESCRIPTION OF THE INVENTION

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

From a central axis of an optical fiber, according to changing of a refractive index, a layer closest to the axis is defined as a core layer, i.e., the core layer refers to a central area of a cross section of the fiber, and an outmost layer of the fiber, i.e., a pure-silicon-dioxide layer, is defined as an outer cladding layer of the fiber.

As used herein, a relative refractive index difference $\Delta n_i$ of a layer of a fiber is defined according to the following formula:

$$\Delta n_i = \frac{n_i - n_c}{n_c} \times 100\%$$

where $n_i$ is a refractive index of the corresponding layer, and $n_c$ is a refractive index of the outer cladding layer, that is, a refractive index of pure silicon dioxide.

As used herein, an effective area $A_{eff}$ of a fiber is defined as:

$$A_{eff} = 2\pi \frac{\left(\int_0^\infty E^2 r dr\right)^2}{\int_0^\infty E^4 r dr}$$

where E is a transmission-related electric field, and r is a distance from an axis to an electric field distribution point.

As defined in the IEC (International Electrotechnical Commission) standard 60793-1-44, a cable cutoff wavelength $\lambda_{cc}$ is a wavelength for which an optical signal no longer transmits as a single-mode signal after transmitting about 22 meters in a fiber. During a test, a fiber needs to be bent into a circle with a radius of about 14 cm and two circles with a radius of 4 cm to obtain data.

The description will be made as to the embodiments of the present invention in conjunction with the accompanying drawings. In accordance with the purposes of this invention, as embodied and broadly described herein, this invention, in one aspect, relates to a single-mode fiber having an ultralow attenuation and a large effective area.

According to one embodiment of the invention as shown in FIG. 1, the optical fiber includes a core layer and cladding layers surrounding the core layer.

In certain embodiments, the core layer has a radius $r_1$ in a range of about 4.8 μm to 6.5 μm, and a relative refractive index difference $\Delta n_1$ in a range of about −0.06% to 0.10%.

In certain embodiments, the cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary cladding layer. The inner cladding layer has a radius $r_2$ in a range of about 9 μm to 15 μm and a relative refractive index difference $\Delta n_2$ in a range of about −0.40% to −0.15%. The trench cladding layer has a radius $r_3$ in a range of about 12 μm to 17 μm and a relative refractive index difference $\Delta n_3$ in a range of about −0.8% to −0.3%. The auxiliary outer cladding layer has a radius $r_4$ in a range of about 37 μm to 50 μm and a relative refractive index difference $\Delta n_4$ in a range of about −0.6% to −0.25%. The outer cladding layer is a pure-silicon-dioxide glass layer.

In certain embodiments, the relative refractive index difference $\Delta n_2$ of the inner cladding layer is in a range of about −0.32% to −0.21%.

In certain embodiments, an effective area of the fiber at a wavelength of about 1550 nm is in a range of about 100 μm² to 140 μm², preferably in a range of about 119 μm² to 140 μm².

In certain embodiments, a cable cutoff wavelength of the fiber is equal to or less than about 1530 nm.

In certain embodiments, a dispersion of the fiber at a wavelength of about 1550 nm is equal to or less than about 23 ps/nm*km, and a dispersion of the fiber at a wavelength of about 1625 nm is equal to or less than about 27 ps/nm*km.

In certain embodiments, an attenuation of the fiber at a wavelength of about 1550 nm is equal to or less than about 0.185 dB/km, and equal to or less than about 0.175 dB/km in preferred conditions.

In certain embodiments, a microbending loss of the fiber at a wavelength of about 1700 nm is equal to or less than about 5 dB/km.

In certain embodiments, a macrobending loss of the fiber at a wavelength of about 1550 nm when bended 10 turns with a bending radius R of 15 mm is equal to or less than about 0.25 dB, and a macrobending loss of the fiber at a wavelength of about 1550 nm when bended 1 turn with a bending radius R of 10 mm is equal to or less than about 0.75 dB.

In certain embodiments, the core layer is a germanium and fluorine co-doped silicon-dioxide glass layer, or a germanium-doped silicon-dioxide glass layer. In certain embodiments, a doping contribution of germanium is in a range of about 0.02% to 0.10%.

Table 1 lists refractive index profile parameters according to embodiments of the present invention, where $\Delta$Ge is the contribution of Ge-doping to refractive index in the core layer. Table 2 is optical transmission characteristics corresponding to the fiber with the refractive index profile in Table 1.

According to the present invention, comprehensive performance parameters such as a cutoff wavelength, a bending loss, and a dispersion of the fiber in the present invention are good in an application waveband. A sufficiently small cable cutoff wavelength ensures a single-mode state of an optical signal in a C-waveband transmission application in the fiber. A fiber profile uses a multi-layer stepped subsided cladding layer structure, where fundamental mode leakage is limited by virtue of the wide subsided cladding layer structure, improving a bending loss of the fiber.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A single-mode fiber with a ultra-low attenuation and a large effective area, comprising:
a core layer and cladding layers surrounding the core layer,

TABLE 1

Fiber profile parameters according to embodiments of the present invention

| Number | Core layer r1 [um] | $\Delta n_1$ [%] | $\Delta$Ge [%] | r2 [um] | $\Delta n_3$ [%] | r3 [um] | $\Delta n_3$ [%] | r4 [um] | $\Delta n_3$ [%] |
|---|---|---|---|---|---|---|---|---|---|
| 1 | 5.5 | 0.04 | 0.08 | 11 | −0.23 | 13.5 | −0.52 | 42 | −0.35 |
| 2 | 5.4 | 0.02 | 0.02 | 11.5 | −0.23 | 15.5 | −0.4 | 48 | −0.38 |
| 3 | 6 | 0 | 0.05 | 12.5 | −0.25 | 15.5 | −0.45 | 45 | −0.4 |
| 4 | 5.3 | 0.03 | 0.05 | 11 | −0.24 | 14.5 | −0.6 | 38 | −0.28 |
| 5 | 5.2 | 0.08 | 0.10 | 10.5 | −0.17 | 14 | −0.38 | 41 | −0.26 |
| 6 | 6 | 0.05 | 0.08 | 13 | −0.2 | 16 | −0.55 | 40 | −0.42 |
| 7 | 5.3 | 0 | 0.08 | 10 | −0.26 | 12.8 | −0.51 | 46 | −0.47 |
| 8 | 5.5 | −0.06 | 0.02 | 13 | −0.38 | 16.5 | −0.75 | 47 | −0.57 |
| 9 | 6.3 | −0.04 | 0.03 | 12 | −0.32 | 13.7 | −0.65 | 44 | −0.5 |
| 10 | 4.8 | −0.02 | 0.04 | 14.5 | −0.23 | 16.5 | −0.63 | 42 | −0.3 |

TABLE 2

Fiber parameters according to embodiments of the present invention

| Number | MFD @1550 | Aeff | Cable Cutoff | Disp @1550 | Disp @1625 | Att. @1550 nm | Microbend @1700 nm | R15 mm-10turn Macrobend @1550 nm | R10 mm-1turn Macrobend @1550 nm |
|---|---|---|---|---|---|---|---|---|---|
| 1 | 12.95 | 141.0 | 1442 | 21.0 | 25.6 | 0.169 | 3.4 | 0.18 | 0.54 |
| 2 | 12.70 | 131.7 | 1464 | 20.5 | 24.9 | 0.163 | 2.9 | 0.08 | 0.25 |
| 3 | 12.70 | 131.7 | 1431 | 21.2 | 25.6 | 0.167 | 3.7 | 0.20 | 0.62 |
| 4 | 11.47 | 107.5 | 1504 | 21.1 | 25.6 | 0.173 | 4.0 | 0.14 | 0.41 |
| 5 | 12.08 | 119.2 | 1450 | 21.1 | 25.6 | 0.181 | 4.1 | 0.15 | 0.45 |
| 6 | 12.70 | 131.7 | 1480 | 21.3 | 25.8 | 0.178 | 3.1 | 0.14 | 0.43 |
| 7 | 11.72 | 112.2 | 1438 | 20.8 | 25.2 | 0.181 | 4.2 | 0.21 | 0.63 |
| 8 | 11.56 | 109.2 | 1522 | 21.0 | 25.4 | 0.169 | 2.4 | 0.09 | 0.29 |
| 9 | 12.36 | 124.8 | 1389 | 21.4 | 25.8 | 0.171 | 4.6 | 0.23 | 0.72 |
| 10 | 12.59 | 129.5 | 1460 | 19.0 | 23.5 | 0.177 | 3.7 | 0.19 | 0.57 | wherein the core layer has a radius $r_1$ in a range of about 4.8 μm to 6.5 μm, and a relative refractive index difference $\Delta n_1$ in a range of about −0.06% to 0.10%;

wherein the cladding layers comprises an inner cladding layer surrounding the core layer, a trench cladding layer surrounding the inner cladding layer, an auxiliary outer cladding layer surrounding the trench cladding layer, and an outer cladding layer surrounding the auxiliary cladding layer, wherein the inner cladding layer has a radius $r_2$ in a range of about 9 μm to 15 μm and a relative refractive index difference $\Delta n_2$ in a range of about −0.40% to −0.15%, the trench cladding layer has a radius $r_3$ in a range of about 12 μm to 17 μm and a relative refractive index difference $\Delta n_3$ in a range of about −0.8% to −0.3%, the auxiliary outer cladding layer has a radius $r_4$ in a range of about 37 μm to 50 μm and a relative refractive index difference $\Delta n_4$ in a range of about −0.6% to −0.25%, and the outer cladding layer is a pure-silicon-dioxide glass layer; and wherein the fiber has an effective area at a wavelength of about 1550 nm being in a range of about 107.5 μm² to 140 μm².

2. The single-mode fiber according to claim 1, having a cable cutoff wavelength being equal to or less than about 1530 nm.

3. The single-mode fiber according to claim 1, having a dispersion at a wavelength of about 1550 nm being equal to or less than about 23 ps/nm*km, and a dispersion at a wavelength of about 1625 nm being equal to or less than about 27 ps/nm*km.

4. The single-mode fiber according to claim 1, having an attenuation at a wavelength of about 1550 nm being equal to or less than about 0.185 dB/km.

5. The single-mode fiber according to claim 1, having a microbending loss at a wavelength of about 1700 nm being equal to or less than about 5 dB/km.

6. The single-mode fiber according to claim 1, having a macrobending loss at a wavelength of about 1550 nm when bended 10 turns with a bending radius R of 15 mm being equal to or less than about 0.25 dB, and a macrobending loss at a wavelength of about 1550 nm when bended 1 turn with a bending radius R of 10 mm being equal to or less than about 0.75 dB.

7. The single-mode fiber according to claim 1, wherein the core layer is a germanium and fluorine co-doped silicon-dioxide glass layer, or a germanium-doped silicon-dioxide glass layer, wherein a doping contribution of germanium is in a range of about 0.02% to 0.10%.

8. The single-mode fiber according to claim 7, having a cable cutoff wavelength being equal to or less than about 1530 nm.

9. The single-mode fiber according to claim 7, having a dispersion at a wavelength of about 1550 nm being equal to or less than about 23 ps/nm*km, and a dispersion at a wavelength of about 1625 nm being equal to or less than about 27 ps/nm*km.

10. The single-mode fiber according to claim 7, having an attenuation at a wavelength of about 1550 nm being equal to or less than about 0.185 dB/km.

11. The single-mode fiber according to claim 7, having a microbending loss at a wavelength of about 1700 nm being equal to or less than about 5 dB/km.

12. The single-mode fiber according to claim 7, having a macrobending loss at a wavelength of about 1550 nm when bended 10 turns with a bending radius R of 15 mm being equal to or less than about 0.25 dB, and a macrobending loss at a wavelength of about 1550 nm when bended 1 turn with a bending radius R of 10 mm being equal to or less than about 0.75 dB.

* * * * *